United States Patent
Lang et al.

(10) Patent No.: US 9,751,629 B2
(45) Date of Patent: Sep. 5, 2017

(54) OXYGEN MODULE

(75) Inventors: Dorothee Lang, Pinneberg (DE); Jorinde Wittkugel, Bad Fallingbostel (DE); Jennifer Schineis, Frankfurt am Main (DE); Sebastian Umlauft, Hamburg (DE); Thomas Vogt, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 929 days.

(21) Appl. No.: 13/553,934

(22) Filed: Jul. 20, 2012

(65) Prior Publication Data

US 2012/0325217 A1  Dec. 27, 2012

Related U.S. Application Data

(63) Continuation of application No. PCT/EP2011/050743, filed on Jan. 20, 2011.

(60) Provisional application No. 61/297,050, filed on Jan. 21, 2010.

(30) Foreign Application Priority Data

Jan. 21, 2010 (DE) .................. 10 2010 005 278

(51) Int. Cl.
*B64D 11/00* (2006.01)

(52) U.S. Cl.
CPC ........ *B64D 11/00* (2013.01); *B64D 2231/025* (2013.01)

(58) Field of Classification Search
CPC ........................ B64D 2231/025; B64D 11/00
USPC .......... 244/118.5, 118.1, 1 R; 292/137, 138, 292/163, 174, 177
See application file for complete search history.

(56) References Cited

U.S. PATENT DOCUMENTS

| | | | |
|---|---|---|---|
| 3,503,394 A | 3/1970 | Hotz et al. | |
| 4,023,874 A * | 5/1977 | Jong | B64D 11/00 244/118.5 |
| 4,154,237 A * | 5/1979 | Courter | 128/206.27 |
| 4,481,945 A * | 11/1984 | Levine | 128/206.27 |
| 4,718,572 A | 1/1988 | Gosse et al. | |
| 5,598,997 A | 2/1997 | Marquardt | |
| 5,803,062 A * | 9/1998 | Aulgur | 128/202.26 |
| 5,816,244 A | 10/1998 | Aulgur | |
| 6,318,364 B1 | 11/2001 | Ford et al. | |
| 7,455,263 B2 | 11/2008 | Lau et al. | |
| 8,443,802 B2 | 5/2013 | Schaeffer, Jr. et al. | |
| 2011/0146686 A1 | 6/2011 | Schneider et al. | |
| 2012/0032027 A1 | 2/2012 | Gehm et al. | |

FOREIGN PATENT DOCUMENTS

DE  19531916 A1  3/1997

* cited by examiner

*Primary Examiner* — Justine Yu
*Assistant Examiner* — Kathrynn Lyddane
(74) *Attorney, Agent, or Firm* — Lorenz & Kopf, LLC

(57) ABSTRACT

A flexible oxygen supply system which can easily be adapted to different seat layouts and which is significantly improved with regard to test and maintenance possibilities. An oxygen module includes an oxygen source, a mask and a tube between the oxygen source and a mask. The oxygen module further includes fastening elements for fastening in a supply duct of an aircraft, and a locking element by means of which the cover of the oxygen module can be locked.

17 Claims, 7 Drawing Sheets

OXYGEN MODULE

CROSS-REFERENCE TO RELATED APPLICATIONS

This is a continuation of International Application No. PCT/EP2011/050743, filed Jan. 20, 2011, which application claims priority to German Application No. 10 2010 005 278.7, filed Jan. 21, 2010 and to U.S. Provisional Application No. 61/297,050, filed Jan. 21, 2010, which are hereby incorporated by reference in their entirety.

TECHNICAL FIELD

The technical field relates to the passenger oxygen supply in an aircraft. In particular, the present disclosure relates to an oxygen module and an oxygen supply duct for an aircraft, and to a combination thereof.

BACKGROUND

DE 10 2008 028 258 A1 discloses a system for supplying oxygen to people in an aircraft. The system comprises an oxygen line, an oxygen supply and a plurality of connection points for oxygen masks, the oxygen line extending in a longitudinal direction and the connection points being connected to the oxygen line.

DE 19 531 916 A1 discloses a method and a device for providing breathing gas in emergency oxygen systems for aircraft.

Current decentralised systems are styled in such a way that an oxygen source, masks and tubes are contained in a container. The container flap is simultaneously part of the lining and comprises an electrically actuated flap locking system which triggers automatic opening in the event of a drop in pressure, or which can be opened manually for testing purposes. During the test function, the flap does not open completely, and therefore the masks are retained and generally do not drop down completely. Thus, it can be difficult to determine the state of the masks. In addition, the installation of the oxygen container and lining panels must be adaptable if the seat layout is to be changed. In addition, other objects, desirable features and characteristics will become apparent from the subsequent summary and detailed description, and the appended claims, taken in conjunction with the accompanying drawings and this background.

SUMMARY

According to various aspects, the present disclosure provides an oxygen supply system which is easy to assemble and easy to test and maintain.

In one exemplary embodiment, the present disclosure provides a flexible oxygen supply system which can easily be adapted to different seat layouts and which is significantly improved with regard to test and maintenance possibilities. An oxygen supply is ensured for all passengers without there being an excessive amount of oxygen supply systems, which would entail unnecessary additional weight. Installation and maintenance is facilitated by simple quick-release connectors and release interfaces. The present disclosure makes it possible to test the complete opening of the linking flaps, thus reducing assembly errors. This can provide good accessibility of the masks for examination and ensures the desired functionality of the masks.

A further advantage is that the breathing masks can remain neatly packed together with the oxygen tubes while the function of the lining flaps is being tested.

According to one exemplary embodiment, an oxygen module generally comprises an oxygen source, a mask and a tube between the oxygen source and a mask. The oxygen module further comprises fastening elements for fastening in a supply duct of an aircraft.

According to various exemplary embodiments, the oxygen source can be either a chemical oxygen source, in which case chemically bonded oxygen is released in an exothermal reaction, or an oxygen reservoir, which for example is controlled purely pneumatically via a screen or electrically, it being possible for corresponding electric connections or contacts to a control unit to be present in the aircraft.

According to another of various exemplary embodiments, the oxygen module also comprises a cover comprising a locking element. In one exemplary embodiment, the cover can be unlocked automatically as soon as the oxygen module is inserted in a supply duct of an aircraft and the cover of the oxygen module is covered by the lining flap at the supply duct.

Generally, since the cover of the oxygen module is mainly intended to prevent the oxygen masks from falling out (during assembly and tests), in one example, the cover can be formed as a plate, or as a mesh or as a film. By using a film or a mesh as a cover, the desired function can be performed at a lower weight.

According to one exemplary embodiment, it is possible initially to insert the oxygen module, which can be introduced as a pre-assembled element into an aircraft body, into a supply duct simply by clicking it in. In this position, the manually closed and locked cover of the oxygen module can prevent the masks from falling out. However, as soon as the lining flap which seals the supply duct off from the passenger cabin is closed, the locking mechanism on the oxygen module is actuated automatically in such a way that the cover of the oxygen module is unlocked.

In another exemplary embodiment, a cover region of the oxygen module can also be coupled to a lining flap via a release element. In this case, the release element may be a mechanical connection, for example a cord or string which unlocks and pulls open the cover region of the oxygen module as soon as the lining flap is opened beyond a predetermined degree. This degree is not reached during an opening test of the lining flaps, and therefore no force is transferred to the cover region or a lock of the cover region via the mechanical release element, whereby the cover region of the oxygen module remains closed during a test of this type.

It is noted that the region of the oxygen module referred to as a cover region may be the part of the housing of the oxygen module which can also be referred to simply as a cover, and that the region referred to as a cover region may also be only part of the cover, which part can be opened by means of the release element.

In the event of a drop in pressure, the lining flap of the supply duct would be released automatically via an electric contact, the lining flap would open completely, and the cover of the oxygen module would likewise open such that the oxygen masks can fall out.

According to one exemplary embodiment, the locking element on the cover of the oxygen module is styled in such a way that the cover of the oxygen module can be locked when the lining flap is closed, such that for a test the lining flap can be released, that is to say opened, via an electric pulse, without the cover of the oxygen module also opening in this case.

According to various exemplary embodiments, to lock the cover manually, an opening in the form of a slot or a differently shaped opening may be provided, through which it is possible to actuate the locking element of the oxygen module. The lining flap may otherwise comprise an actuation element via which the locking element is actuated and thus the cover of the oxygen module is locked. It is also possible for the cover to be locked by means of an electric actuator or by means of an electromagnetic switch. The electric signal required for this purpose could for example be transmitted via the fastening element which is used to fasten the oxygen module in the supply duct.

According to another exemplary embodiment, the possibility of adapting the arrangement of the oxygen module in a supply duct of an aircraft to a seat layout or to a change in the seat layout is provided. For this purpose, according to the present disclosure a supply duct is provided which is formed continuously in the longitudinal direction of the aircraft body and on which a plurality of fastening elements or a fastening rail is provided as a fastening structure to which an oxygen module can be fastened by hooking or clicking it in. To seal the supply duct, a plurality of lining flaps is usually required, which flaps generally have the length and the dimensions of the other panels used in the passenger cabin.

According another exemplary embodiment, in an aircraft which comprises a supply duct formed continuously in the longitudinal direction of the aircraft body, an oxygen module can be inserted at any desired points inside the supply duct. Even if the oxygen module is arranged at a point which is covered by two adjacent lining flaps, the mode of operation described in general above is not impaired, since the lining flaps can be opened simultaneously.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 8 shows the lining flap being closed manually.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
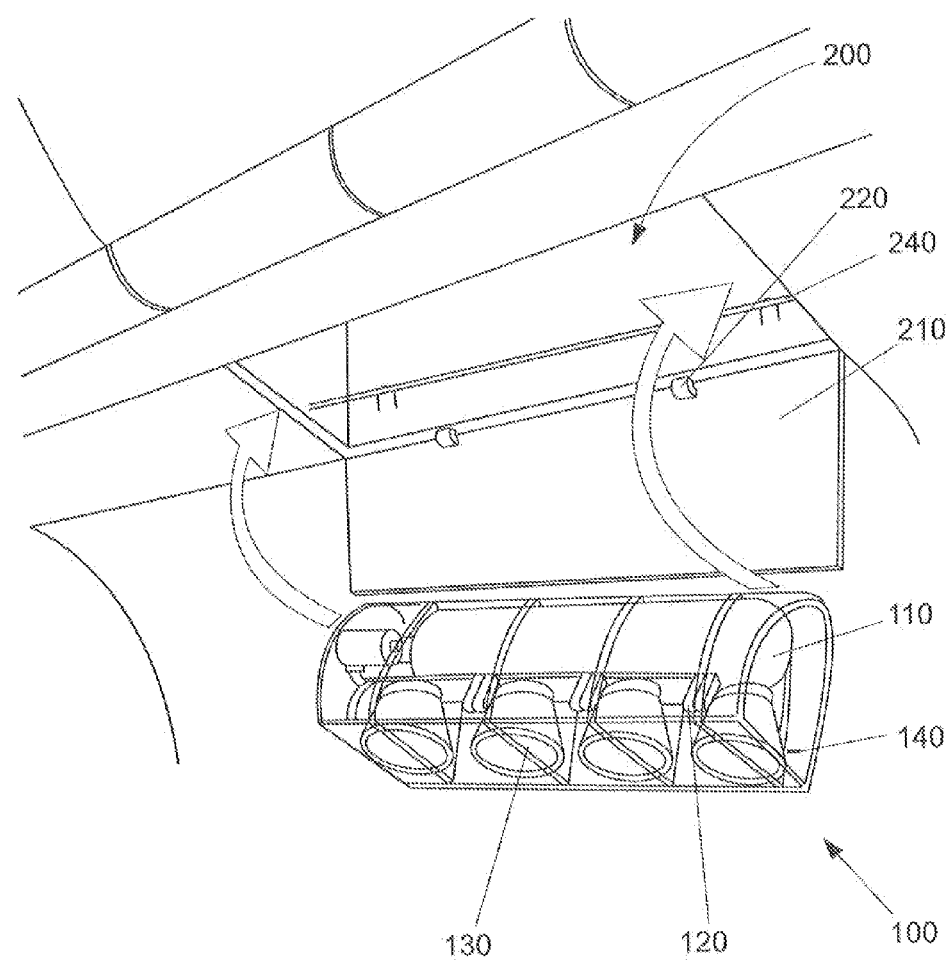
FIG. 1 is an isometric view of an oxygen module prior to insertion into a supply duct.

FIG. 1 shows an oxygen module 100 according to various aspects of the present disclosure. The oxygen module 100 comprises an oxygen source 110, tubes 120 and masks 130. The oxygen module 100 further comprises fastening elements 140 which are capable of engaging in corresponding fastening elements 240 on the supply duct.

The supply duct 200 shown in FIG. 1 comprises a lining flap 210, joints 220 and fastening elements 240. The lining flap 210 is mounted in an articulated manner at the joints 220 such that releasing or opening the supply duct causes the lining flaps 210 to swing open about the pivot points 220.

It is noted that the fastening elements 140 and 240 shown in this case are merely exemplary and a large number of other possibilities for hooking or clicking in an oxygen module in a supply duct are conceivable. These fastening elements 140, 240 can also be used as contacts for the transmission of electric signals, pulses or electric energy in the case that, for example, the delivery of oxygen to a mask is controlled electrically or electronically.

It is also noted that the oxygen module shown in FIG. 1 is equipped with four masks. However, an oxygen module according to the present disclosure can also be equipped with only one mask, one tube and one oxygen source. Accordingly, an oxygen module comprising two, three or more masks is also conceivable.

Figure 2:
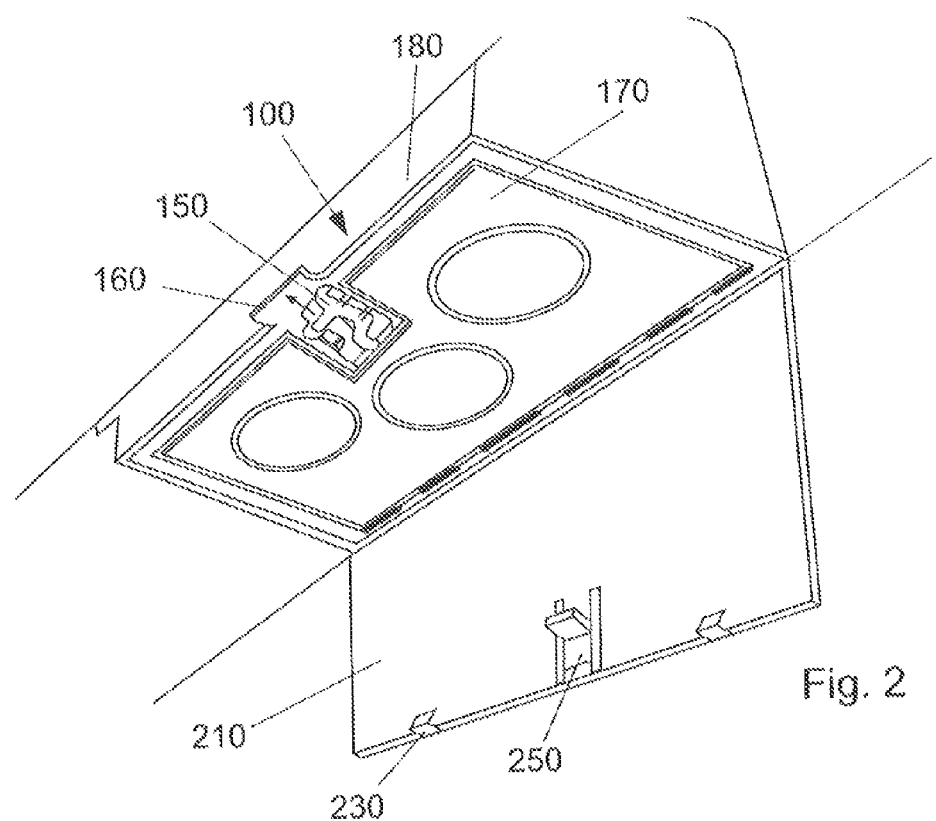
FIG. 2 shows an oxygen module which is inserted in a supply duct, with a lining flap, according to one of various exemplary embodiments of the present disclosure.

As shown in FIG. 2, the oxygen module 100 comprises a locking element 150 having a corresponding tab 160. The locking element 150 is arranged on the cover 170 of the oxygen module 100 and the tab 160 is arranged accordingly on a housing or frame 180 of the oxygen module. On the side facing the locking element 150, the cover 170 comprises hinges arranged accordingly, such that the cover 170 can be opened in accordance with the lining flap 210.

FIG. 2 shows a lining flap 210 according to one exemplary embodiment of the present disclosure. This lining flap comprises an actuation element 250 which is arranged in a position opposite the locking element 150. A plurality of actuation elements 250, which can be arranged at appropriate intervals from one another, can be provided along the longitudinal direction of an aircraft body and of the supply duct. This allows an arrangement of oxygen modules at intervals which correspond to conventional intervals between rows of seats for passengers. In FIG. 2 an element 230 is also indicated which represents the electrically triggered opening mechanism of the lining flap.

Figure 3:
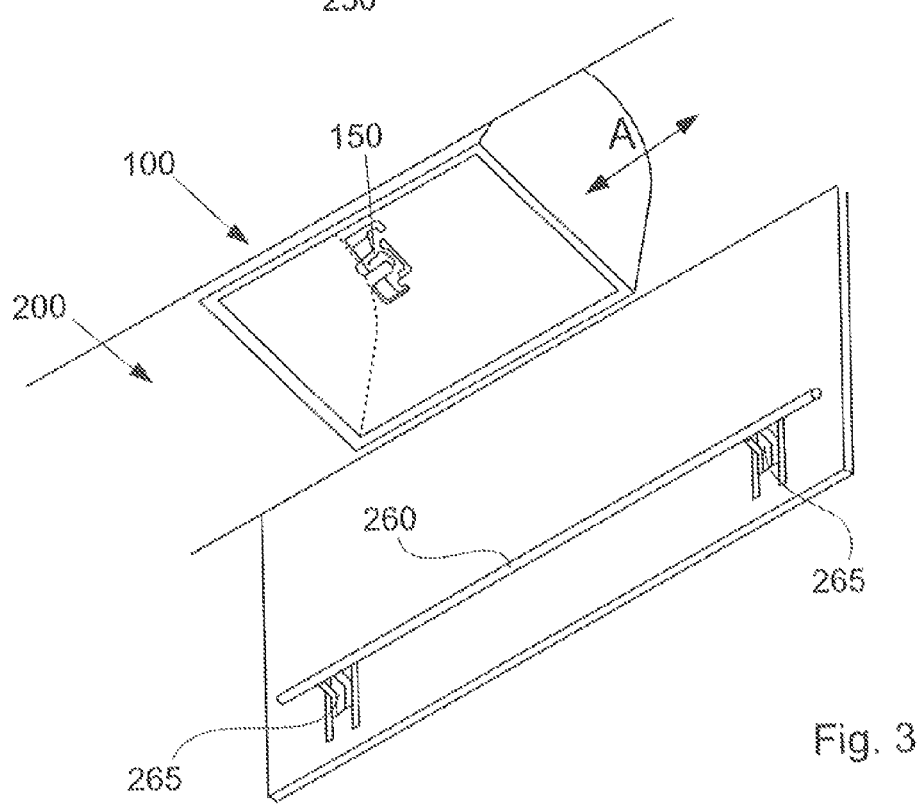
FIG. 3 shows an oxygen module which is inserted in a supply duct, with a lining flap, according to another exemplary embodiment of the present disclosure.

FIG. 3 shows a lining flap according to another exemplary embodiment of the present disclosure. In this case, the actuation element is a rail 260 which can be operated via the element 265 such that the rail 260, which is in engagement with the locking element 150 on the oxygen module 100, can move the locking element 150 from a release position, in which the cover of the oxygen module can be opened, into a locked position, in which the cover is locked. As indicated by arrow A, the oxygen module 100 can in this case be positioned as desired inside the supply duct 200, since actuation of the locking element 150 by the rail 260 is possible in every position.

The process of locking the cover of the oxygen module is described below.

Figure 4:
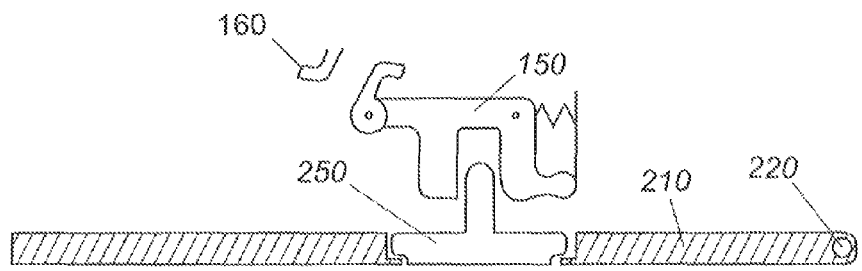
FIGS. 4 to 6 show a movement sequence in which the cover of the oxygen module is locked manually.

FIG. 4 shows the situation in which the oxygen module is inserted in the supply duct and the lining flap 210 is closed. In this case, the actuation element 250 is located adjacent to the locking element 150.

Figure 5:
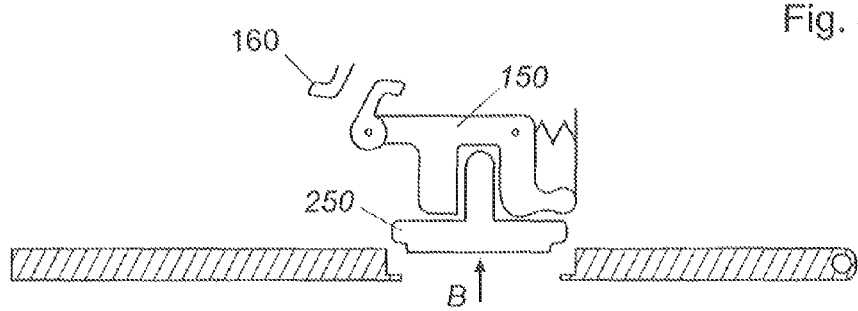

In FIG. 5, the actuation element 250 is then pushed in the direction of arrow B. Owing to the displacement of the actuation element 250, said element engages in a recess in the locking element 150.

Figure 6:
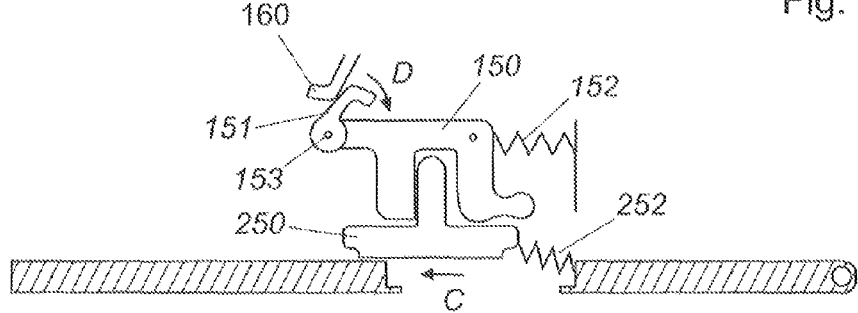

As shown in FIG. 6, the actuation element 250 is then displaced together with the locking element 150 in the direction of arrow C. In the case of a displacement of this type, a spring 252 at the actuation element 250 and also a spring 152 at the locking element 150 are tensioned. When the tab 160 is reached, a hook 151 is pivoted about a centre of rotation 153 in the direction of arrow D. As soon as the hook 151 has been displaced past the tab 160 in the direction of arrow C, a return spring (not shown) ensures that the hook 151 moves back into its original position or is reset.

Figure 7A:
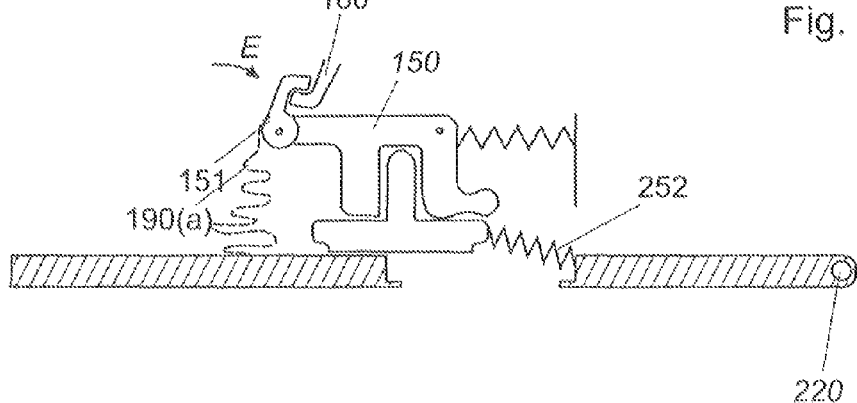
FIGS. 7A and 7B show the lining flap being opened when the cover is locked.
Figure 7B:
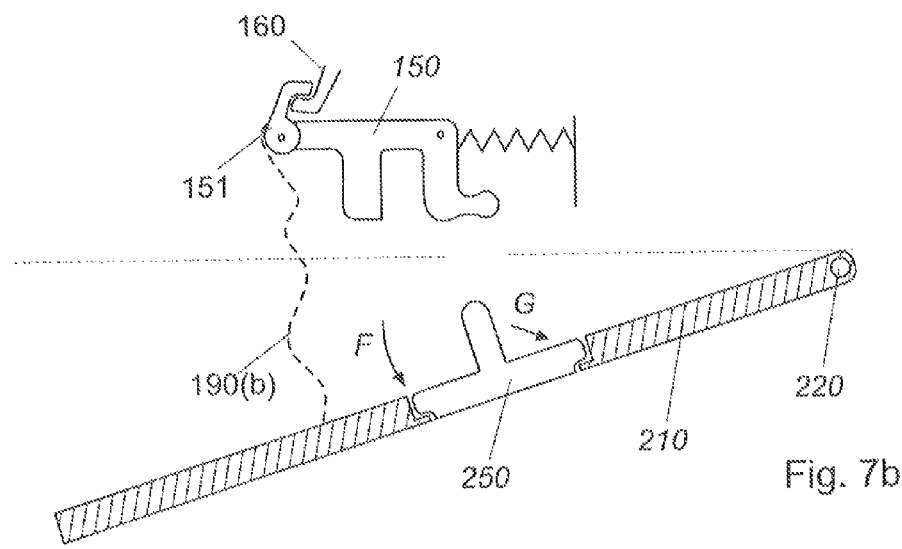

FIGS. 7A and 7B show the lining flap 210 being opened, for example in a test case. Owing to the above-described manual actuation of the locking element 150, the hook 151 of said element is hooked onto the tab 160 such that the cover of the oxygen module does not open, even when the lining flap 210 swings open about the pivot point 220 in the direction of arrow F as shown in FIG. 7B. As soon as the actuation element 250 disengages from the locking element 150 when the lining flap 210 swings open, the spring 252 pulls the actuation element 250 back in the direction of arrow G into its starting position and thus into an opening provided in the lining flap.

Figure 8A:
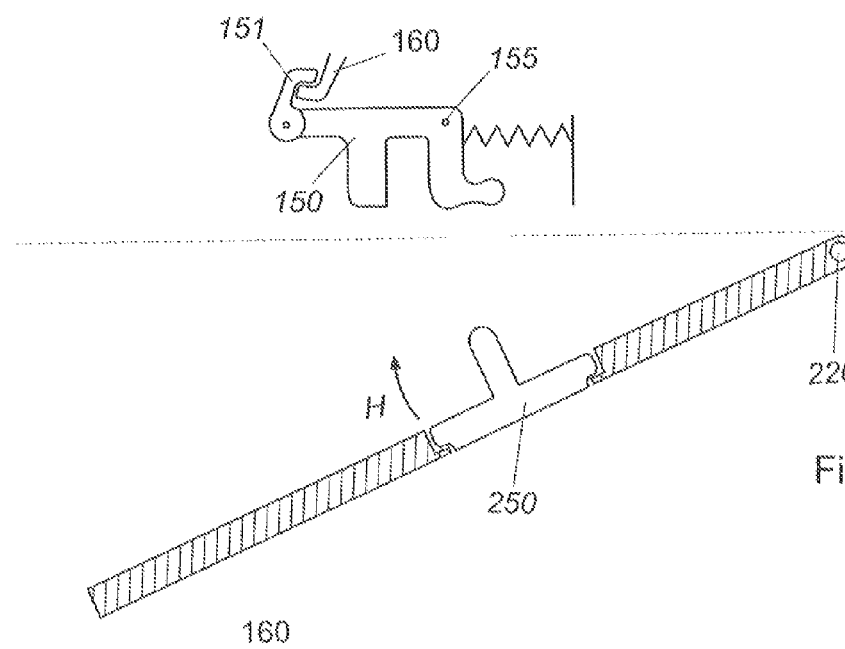
FIGS. 8A and 8B show the lining flap being closed manually.
Figure 8B:
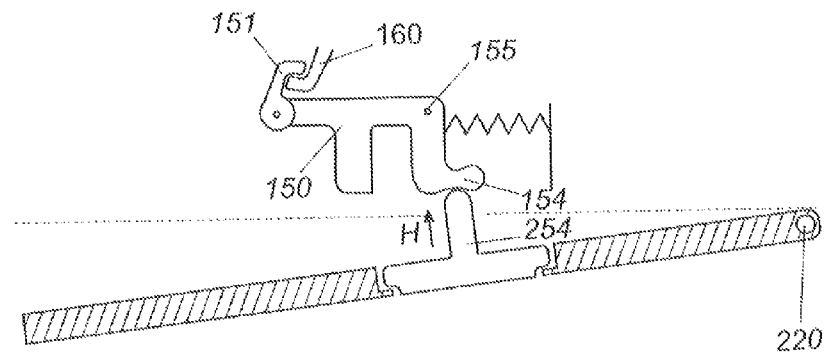

Once the test is over, the lining flap 210 is closed again manually. FIGS. 8A and 8B show that, in the case of a movement in arrow direction H, a peg 254 of the actuation element 250 initially rests against a projection 154, the projection 154 being formed on the locking element 150.

Figure 9:
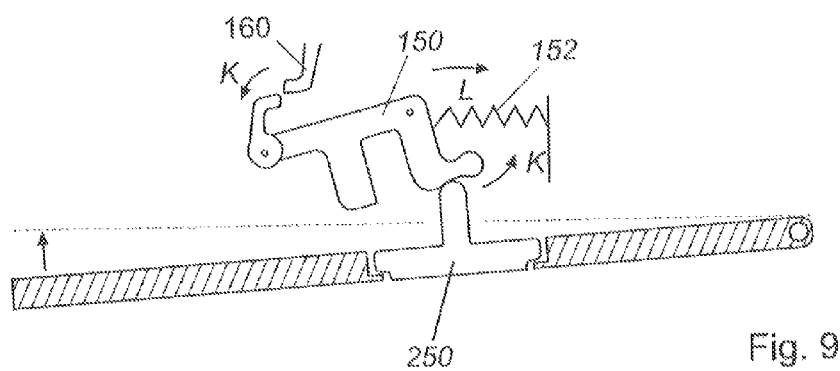
FIGS. 9 and 10 show the cover of the oxygen module being unlocked automatically by closing the lining flap.
Figure 10:
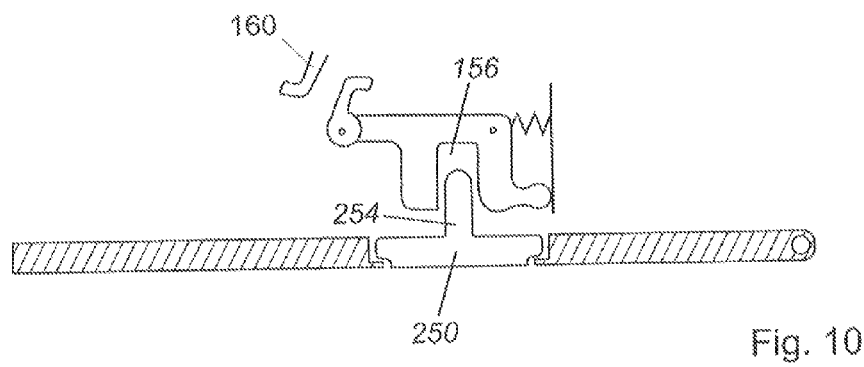

As closure of the lining flap continues, the locking element 150 is then pivoted in the direction of arrow K about the centre of rotation 155, such that the hook 151 slips off of the tab 160, as shown in FIG. 9. The locking element 150 is thus pulled back in arrow direction L owing to the action of the spring 152, such that the peg 254 on the actuation element 250 engages in a recess 156 in the locking element 150 again and the locking element 150 is arranged in its original position again, that is to say in a release position. This arrangement, which is comparable with the starting position in FIG. 4, is shown in FIG. 10.

Figure 11:
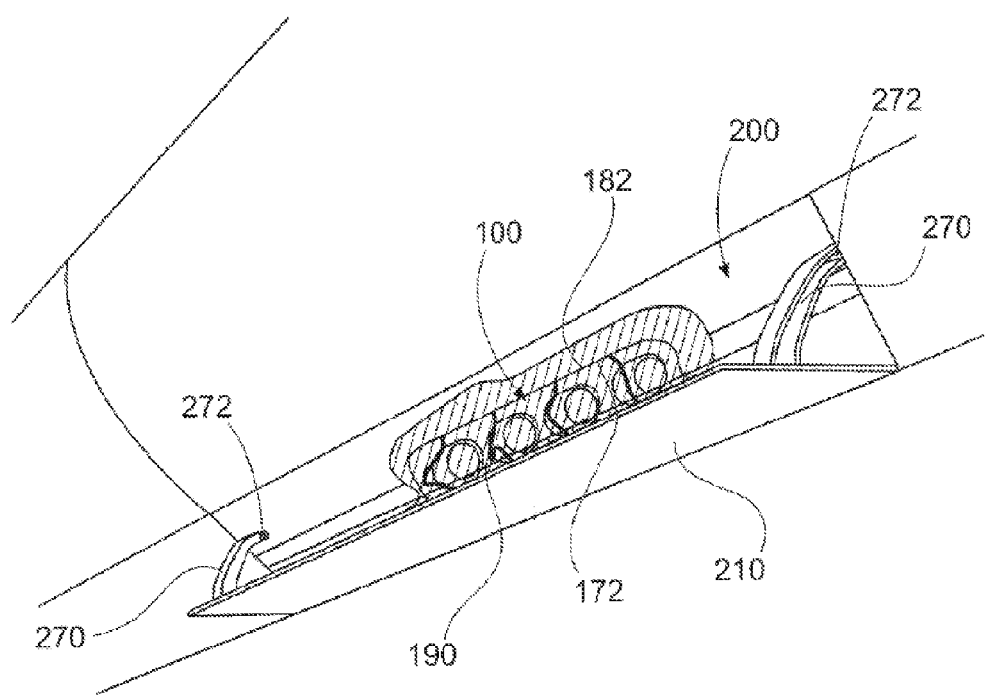
FIG. 11 shows an oxygen module which is inserted in a supply duct, with a lining flap, according to another exemplary embodiment of the present disclosure.

In the exemplary embodiment shown in FIG. 11, the oxygen module 100 comprises a housing which is made from a thin material. For example, the housing may comprise a film which surrounds the masks, the tubes and the oxygen source. The housing further comprises a cover region 170 and a frame region 180, the cover region 170 forming an edge 172, and the frame region 180 forming an edge 182. The two edges 172, 182 are arranged at a common separating line when the housing of the oxygen module is closed.

As can be seen in FIG. 11, the lining flap 210 may comprise guide rails 270 which are curved such that a respective peg 272 can engage in each of these guide rails. For a lining flap test, the pegs can be arranged in such a way that they engage in the guide rails and thus prevent the lining flap from opening further than predefined by the length of the guide rails.

The pegs 272 can also be disengaged from the rails 270 such that the lining flaps can open completely, for example in the event of a drop in pressure. The lining flaps will then swing open completely owing to their weight and the articulated mounting thereof on one side.

At least one release element is attached between the cover region 170 and the lining flap 210. The release element may be fastened at one end near the edge 172 of the cover region 170, and can easily be connected at its other end to a connecting element 280 on the lining flap after the oxygen module is inserted into a supply duct.

If the lining flap is opened completely, the release element 190 will release the cover region 170 from the frame region 180 at the line separating these regions, such that the cover region is opened and the breathing masks can fall out of the oxygen module 100. This is shown in FIG. 12.

Figure 12:
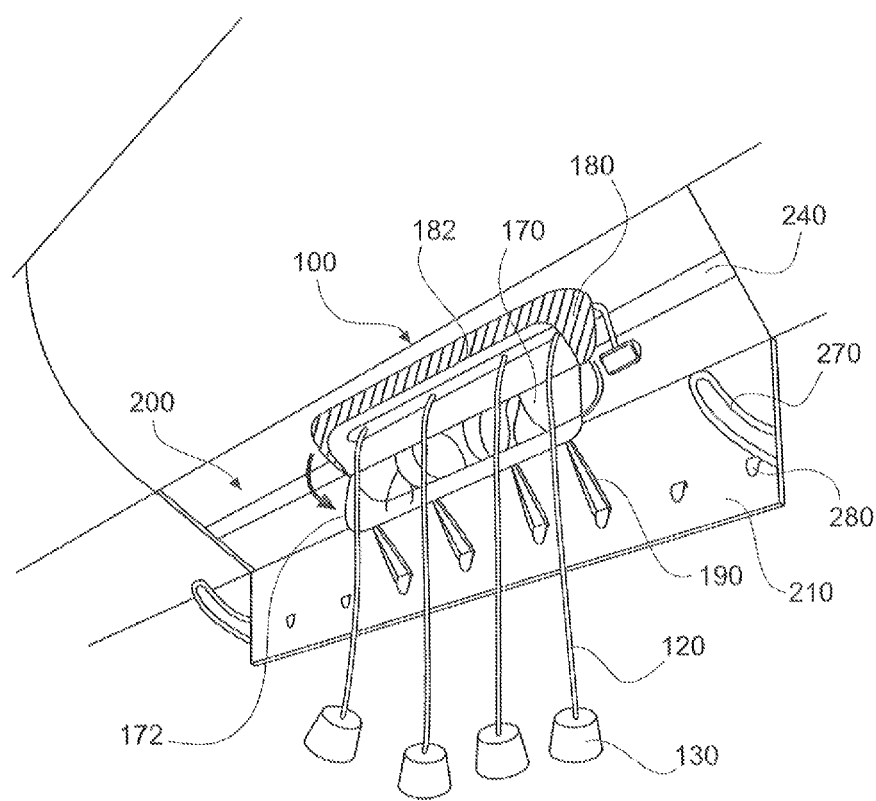
FIG. 12 shows an oxygen module in a supply duct after automatic, complete opening of the lining flap.

FIG. 12 also shows that the curved guide rails 270 are no longer in contact with the pegs 272 and that the release elements 190 are hooked into hook-like connecting elements 280. When the lining flap dropped down, the release elements 190 separated the edge 172 of the cover region 170 from the edge 182 of the frame region 180 and thus opened the oxygen module, as indicated by the arrow. The masks 130, which are connected to an oxygen source via the tubes 120, have thus fallen out of the opened housing of the oxygen module 100.

In this case, too, the oxygen module is fastened in a supply duct 200 by means of a fastening rail 240, as described above.

It is noted that the releasable connection at the separating line between the cover region 170 and the frame region 180 may be a perforation in a film, a hook-and-loop fastener, a predetermined breaking point or a snap lock having appropriate structures.

Reference is also made to the fact that a combination of the locking structures shown in FIGS. 2 and 3 and the release element according to FIGS. 11 and 12 represents one embodiment of the invention. This is indicated in FIGS. 7A and 7B.

The broken lines in FIGS. 7A and 7B show that the hook 151 can also be connected to the locking flap 210 via a release element 190. If the release element is for example a cord or a string, this release element 190(a) is arranged loosely between the fastening points at the hook 151 and the locking flap 210 as long as the locking flap 210 is closed.

In a test case, which is shown in FIG. 7B, the release element 190(b) is then substantially straight, but still does not receive or transfer a force.

Should the locking mechanism fail to release the cover upon complete opening of the lining flap, the release element 190 would pull the hook 151 from the tab 160 and thus open the cover. In this way, increased safety is achieved.

According to the present disclosure, an oxygen module is thus provided which can easily be pre-assembled, since a cover which is lockable is provided on the oxygen module. This prefabricated oxygen module comprising a lockable cover can then easily be inserted into a supply duct of an aircraft at any desired point in the longitudinal direction. As soon as a sufficient number of oxygen modules, depending on the seat layout, are arranged in the desired position in the supply duct, the lining flaps of the supply duct can be closed manually, which can cause (as described above) the covers of the oxygen modules to be unlocked automatically.

In the event that a change in the seat layout of the passenger cabin or merely part of the passenger cabin is desired, the covers of the corresponding oxygen modules can initially be locked manually by means of the actuation elements on the lining flaps. Opening of the corresponding lining flaps is then triggered via an electric pulse or manually, whereby free access to the oxygen modules arranged under these lining flaps is provided. Once the oxygen modules have been rearranged, displaced or relocated, the lining flaps can be closed again, whereby the covers of the oxygen modules can be unlocked again.

In the case of maintenance, a faulty oxygen module can easily be replaced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An oxygen module for supplying oxygen to passengers of an aircraft, the aircraft comprising a supply duct, a releasable lining flap having a closed state that encloses the oxygen module in the supply duct and having an open state to expose the oxygen module, the oxygen module comprising:
   an outer housing comprising a locking tab;
   an oxygen source;
   a mask;
   a tube between the oxygen source and the mask;
   a fastening element for fastening the oxygen module in the supply duct of the aircraft; and
   a releasable cover including a locking element, the locking element being movable between a test configuration and an operation configuration;
   wherein the locking element is configured to engage the locking tab of the outer housing in response to movement of the locking element into the test configuration with the releasable lining flap in the closed state, wherein engagement of the locking element with the locking tab locks the cover of the oxygen module to the outer housing in a closed position; and
   wherein the locking element is configured to disengage the locking tab of the outer housing in response to movement of the locking element into the operation configuration, wherein disengagement of the locking element from the locking tab unlocks the cover of the oxygen module from the outer housing to enable opening of the cover in response to opening of the lining flap from the closed state to the open state.

2. The oxygen module according to claim 1, further comprising:
   a release element attached between the oxygen module and the lining flap in such a way that the cover of the oxygen module opens when the lining flap is opened beyond a predetermined degree.

3. The oxygen module according to claim 1, wherein the fastening element is formed in such a way that the oxygen module is displaceable within the supply duct.

4. The oxygen module according to claim 1, wherein the oxygen module further comprises a plurality of masks and tubes.

5. The oxygen module according to claim 1, wherein the oxygen module further comprises a plurality of oxygen sources.

6. An oxygen supply duct assembly comprising:
   a releasable lining flap having a closed state that encloses an oxygen module in a supply duct and having an open state to expose the oxygen module;
   a fastening structure; and
   the oxygen module including an outer housing comprising a locking tab, an oxygen source, a mask, and a tube between the oxygen source and the mask, the oxygen module having a releasable cover including a locking element that is movable from a first position to a second position while the releasable lining flap is in the closed state, the locking element configured to engage the locking tab of the outer housing in response to movement of the locking element into the second position, wherein engagement of the locking element with the locking tab locks the cover of the oxygen module to the outer housing in a closed position to prevent the cover of the oxygen module from opening during testing of a release of the lining flap, and the locking element configured to disengage the locking tab of the outer housing in response to movement of the locking element from the second position to the first position, wherein disengagement of the locking element from the locking tab unlocks the cover of the oxygen module from the outer housing to enable automatic opening of the cover in response to opening of the lining flap from the closed state to the open state;
   wherein the fastening structure positions the oxygen module in the longitudinal direction of the supply duct and secures it in the supply duct with a fastening element.

7. The oxygen supply duct assembly according to claim 6, further comprising:
   an actuation element that actuates the locking element of the oxygen module.

8. The oxygen supply duct assembly according to claim 6, further comprising:
   a release element attached between the oxygen module and the lining flap in such a way that the cover of the oxygen module opens when the lining flap is opened beyond a predetermined degree.

9. The oxygen supply duct assembly according to claim 8, further comprising:
   a connecting element on the lining flap, for connecting the release element of the oxygen module to the connecting element when the oxygen module is inserted in the oxygen supply duct and the lining flap is not opened beyond the predetermined degree.

10. The oxygen supply duct assembly according to claim 6, wherein the oxygen module further comprises a plurality of masks and tubes.

11. The oxygen supply duct assembly according to claim 6, wherein the oxygen module further comprises a plurality of oxygen sources.

12. The oxygen supply duct assembly according to claim 6, further comprising:
    a supply duct into which the oxygen module is inserted.

13. An aircraft comprising:
    an oxygen supply duct including a releasable lining flap and a fastening structure; and an oxygen module having an outer housing comprising a locking tab, a releasable cover including a locking element having a first position and a second position;

wherein, when the locking element is in the first position, the locking element is disengaged from the locking tab of the outer housing and disengagement of the locking element from the locking tab unlocks the cover of the oxygen module from the outer housing to enable opening of the cover together with the lining flap in response to opening of the lining flap;

wherein, when the locking element is in the second position, the locking element is engaged with the locking tab of the outer housing and engagement of the locking element with the locking tab locks the cover of the oxygen module to the outer housing in a closed position during testing of releasing of the lining flap;

wherein the locking element is movable from the first position into the second position while the lining flap is closed; and wherein the fastening structure is formed so that the oxygen module is positionable in the longitudinal direction of the supply duct and secured in the supply duct via a fastening element.

14. The aircraft according to claim 13, further comprising:
an actuation element that actuates the locking element of the oxygen module.

15. The aircraft according to claim 13, further comprising:
a release element attached between the oxygen module and the lining flap in such a way that the cover of the oxygen module opens when the lining flap is opened beyond a predetermined degree.

16. The aircraft according to claim 13, further comprising:
a connecting element on the lining flap, for connecting the release element of the oxygen module to the connecting element when the oxygen module is inserted in the oxygen supply duct and the lining flap is not opened beyond a predetermined degree.

17. The aircraft according to claim 13, wherein the oxygen module further comprises a plurality of oxygen sources, a plurality of masks and a plurality of tubes, with a respective one of the plurality of tubes coupled between a respective one of the plurality of oxygen sources and a respective one of the plurality of masks.

\* \* \* \* \*